(No Model.)

H. E. KIRSTEIN.
EYEGLASSES.

No. 393,987. Patented Dec. 4, 1888.

Witnesses.
P. F. Eagle.
F. Norman Dixon

Henry E. Kirstein,
Inventor,
By his Attorneys
Wm C. Strawbridge
D. Bonsall Taylor

UNITED STATES PATENT OFFICE.

HENRY E. KIRSTEIN, OF ROCHESTER, NEW YORK.

EYEGLASSES.

SPECIFICATION forming part of Letters Patent No. 393,987, dated December 4, 1888.

Application filed July 2, 1888. Serial No. 278,762. (No model.)

*To all whom it may concern:*

Be it known that I, HENRY EDWARD KIRSTEIN, a citizen of the United States, residing at Rochester, in the State of New York, have invented an Improvement in Eyeglasses, of which the following is a specification.

My invention relates to the means for mounting and applying nose rests to eyeglasses, and its object is the provision of such mounting and supporting devices for the nose rests as will confer upon them, not only adjustability to different inclinations in their common plane, but also adjustability against the stress of springs applied directly to them with regard to the distance which separates them.

Figure 1:
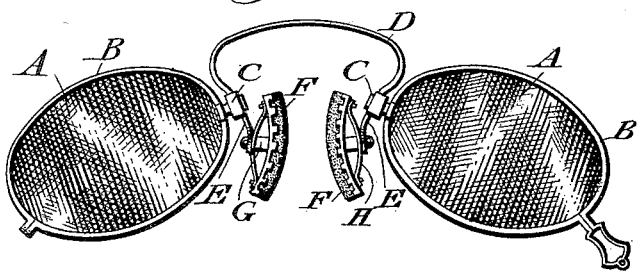
Figures 2, 4:
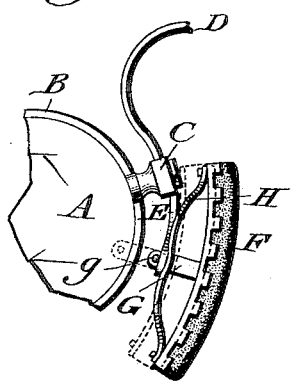
Figure 3:
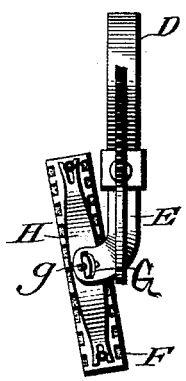
Figures 5, 6:
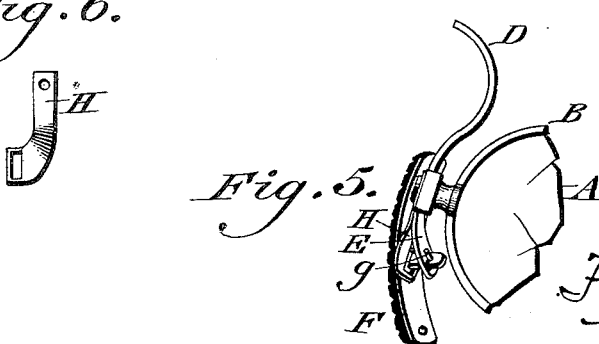

In the drawings, Figure 1 is a front or face view of a pair of glasses provided with a preferred embodiment of my invention. Fig. 2 is a magnified fragmentary detail view of one of the nose rests and attached devices of Fig. 1. Fig. 3 is a right hand end view of the devices shown in Fig. 1. Fig. 4 is a detail view of the parts of the device shown in Fig. 2, the spring being in section. Figs. 5 and 6 are detail views of a modified form of my invention.

Similar letters of reference indicate corresponding parts.

In the drawings, A A are the lenses of a pair of glasses; B B are the rims; C C are the clamp posts; and D is the bow spring. These devices are of any ordinary form and construction.

Referring to Figs. 1, 2, 3 and 4, E E are off-set or supporting plates, the inner ends of which are attached to clamp posts in any usual manner, and the outer ends of which are each provided with an orifice for a purpose hereinafter described.

F F are the nose rests, being in the drawings shown as the ordinary metal-backed, cork-faced devices, well known in the art.

G is a clip or arm, attached to or formed as a part of the metal back of each nose rest, and extending perpendicularly thereto. The length of each arm is such as is necessary to enable the rest to which it is attached to possess the required extent of forward and backward play. Each arm G is passed through the orifice in the off-set plate to which it is applied, and is as to its outer end or tip enlarged or equipped, for instance, with a pin $g$ passing transversely through itself to prevent its withdrawal. The arm being somewhat smaller in diameter than the orifice through which it is passed, is free to, together with its applied nose rest, rock or vary its adjustment so that the nose rest may occupy various inclinations in the same plane.

H are springs interposed between the nose rests and off set plates, and by the expansive action of which the nose rests are maintained, in the absence of countervailing pressure, in a position as near to each other as the length of the arms G will permit, as shown in the drawings. I prefer to employ for the purpose described springs of the semi-elliptic variety illustrated.

The extremities of each spring may be conveniently recessed or provided with elongated slots which take into studs or rivets at the ends of the nose rests, whereby the spring is allowed the play necessary in its expansion and contraction, and at the same time retains its hold upon the nose rest. The spring is conveniently provided with an orifice through which in the mounting of the parts the arm G passes.

The operation of the device is obvious:— Upon being seated upon noses of width greater than the normal separation of the nose rests, the springs are compressed and the arms as to their free ends pushed outward beyond the off-set plate and at the same time the nose rests are tilted or rocked to the proper inclination and thus the glasses are accommodated to the wearer and the nose rests held upon the nose of the wearer with a yielding pressure without materially flexing the bow spring or disturbing the relationship of the lenses to each other.

All of the drawings illustrate my improvement as applied to glasses the nose rests of which are off-set or lie in a plane other than that occupied by the lenses, but it is obvious that my improvements are applicable to glasses in which the nose rests and lenses lie in the same plane.

In Fig. 5 is shown the application, in connection with an off-set plate, nose rest, and projecting arm of the construction hereinbefore detailed, of a spring (shown in detail in Fig. 6) which as in the preferred construction first described, lies between the off-set plate and the nose rest. One end of the spring is rigidly attached to the clamp post C, and the spring following the curvature of the off-set plate, extends to and encircles the arm of the nose rest.

Other forms of spring than those shown, as for example a spiral spring encircling the arm G, might be employed, without departing from my invention.

It is obvious that the spring instead of being placed between the supporting or off-set plate and the nose rest, may be by an obvious modification arranged as a contractile spring and placed between the pin or stop on the outer end of the arm and the supporting plate.

I do not herein claim broadly or seek to cover the mode of attaching a nose rest to an off-set or other supporting plate by means of an arm springing from the back of said nose rest, passing through an orifice in the supporting plate, and held therein by means of a pin or other detent, as such means form the subject of a separate application for patent filed by me in the United States Patent Office upon the 12th day of January 1888, as Serial No. 260,560.

Having thus described my invention, I claim:—

1. In eyeglasses, in combination, a clamp post, an off set or supporting plate, a nose rest, an arm projecting from the back face of said nose rest passing through the supporting plate and provided with a stop, and a spring mounted in connection with the nose rest and bearing against the off-set plate, substantially as set forth.

2. In eyeglasses, in combination, a clamp post, an off set or supporting plate, a nose rest, an arm springing from the back face of said nose rest and passing through the supporting plate, a pin passing transversely through the tip of said arm, said arm being of length greater than the thickness of the supporting plate, and a spring interposed between the supporting plate and the nose rest, substantially as set forth.

3. In eyeglasses, in combination, a clamp post, an off set or supporting plate, a nose rest, an arm springing from the back face of said nose rest and passing through the supporting plate, a pin passing transversely through the tip of said arm, and a spring plate interposed between the supporting plate and the nose rest, substantially as set forth.

4. In eyeglasses, in combination, a clamp post, an off set or supporting plate, a nose rest, an arm springing from the back face of said nose rest and passing through the supporting plate, a pin passing transversely through the tip of said arm, and a semi-elliptic spring interposed between the supporting plate and the nose rest, having its ends slotted, and studs upon the rear of the nose rest which take into said slots, substantially as set forth.

In testimony that I claim the foregoing as my invention I have hereunto signed my name this 15th day of June, A. D. 1888.

HENRY E. KIRSTEIN.

In presence of—
J. BONSALL TAYLOR,
F. NORMAN DIXON.